(12) United States Patent
Deleeuw

(10) Patent No.: US 11,181,980 B2
(45) Date of Patent: Nov. 23, 2021

(54) NATURAL HUMAN-COMPUTER INTERACTION FOR VIRTUAL PERSONAL ASSISTANT SYSTEMS

(71) Applicant: Intel Corporation, Santa Clara, CA (US)

(72) Inventor: William C. Deleeuw, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/902,967

(22) Filed: Jun. 16, 2020

(65) Prior Publication Data

US 2021/0072825 A1    Mar. 11, 2021

Related U.S. Application Data

(60) Continuation of application No. 16/257,347, filed on Jan. 25, 2019, now Pat. No. 10,684,683, which is a
(Continued)

(51) Int. Cl.
*G06F 3/01* (2006.01)
*G10L 15/22* (2006.01)
(Continued)

(52) U.S. Cl.
CPC ......... *G06F 3/013* (2013.01); *G06K 9/00604* (2013.01); *G06K 9/2018* (2013.01);
(Continued)

(58) Field of Classification Search
CPC ......... G06F 3/013; G06T 13/80; G10L 15/02; G10L 15/22; G10L 2015/025;
(Continued)

(56) References Cited

U.S. PATENT DOCUMENTS

| 5,799,276 A | 8/1998 | Komissarchik et al. |
| 6,317,711 B1 | 11/2001 | Muroi |

(Continued)

FOREIGN PATENT DOCUMENTS

| CN | 1134074 A | 10/1996 |
| CN | 1164801 A | 11/1997 |

(Continued)

OTHER PUBLICATIONS

"Speech recognition," Wikipedia, The Free Encyclopedia, retrieved from: http://en.wikipedia.org/w/index.phptitle=Speech.sub.-recognition ol- did=528092164, edited Dec. 15, 2012, 12 pages.
(Continued)

*Primary Examiner* — Abhishek Sarma
(74) *Attorney, Agent, or Firm* — Hanley, Flight & Zimmerman, LLC

(57) ABSTRACT

Technologies for natural language interactions with virtual personal assistant systems include a computing device configured to capture audio input, distort the audio input to produce a number of distorted audio variations, and perform speech recognition on the audio input and the distorted audio variants. The computing device selects a result from a large number of potential speech recognition results based on contextual information. The computing device may measure a user's engagement level by using an eye tracking sensor to determine whether the user is visually focused on an avatar rendered by the virtual personal assistant. The avatar may be rendered in a disengaged state, a ready state, or an engaged state based on the user engagement level. The avatar may be rendered as semitransparent in the disengaged state, and the transparency may be reduced in the ready state or the engaged state. Other embodiments are described and claimed.

29 Claims, 6 Drawing Sheets

Related U.S. Application Data continuation of application No. 15/452,131, filed on Mar. 7, 2017, now Pat. No. 10,198,069, which is a division of application No. 14/129,435, filed as application No. PCT/US2013/041866 on May 20, 2013, now Pat. No. 9,607,612.

(51) Int. Cl.
| | | |
|---|---|---|
| *G06K 9/00* | (2006.01) | |
| *G06K 9/20* | (2006.01) | |
| *G06T 13/80* | (2011.01) | |
| *G10L 15/02* | (2006.01) | |
| *G10L 21/003* | (2013.01) | |
| *G10L 15/30* | (2013.01) | |

(52) U.S. Cl.
CPC .............. *G06T 13/80* (2013.01); *G10L 15/02* (2013.01); *G10L 15/22* (2013.01); *G10L 15/30* (2013.01); *G10L 21/003* (2013.01); *G10L 2015/025* (2013.01); *G10L 2015/227* (2013.01); *G10L 2015/228* (2013.01)

(58) Field of Classification Search
CPC . G10L 2015/228; G10L 15/30; G10L 21/003; G10L 2015/227; G06K 9/00604; G06K 9/2018
See application file for complete search history.

(56) References Cited

U.S. PATENT DOCUMENTS

| | | | |
|---|---|---|---|
| 6,360,202 | B1 | 3/2002 | Bhadkamkar et al. |
| 6,793,673 | B2 | 9/2004 | Kowalsky et al. |
| 6,824,562 | B2 | 11/2004 | Mathis et al. |
| 6,908,478 | B2 | 6/2005 | Alferness et al. |
| 6,949,122 | B2 | 9/2005 | Adams et al. |
| 6,960,229 | B2 | 11/2005 | Mathis et al. |
| 6,964,683 | B2 | 11/2005 | Kowalsky et al. |
| 6,976,995 | B2 | 12/2005 | Mathis et al. |
| 7,179,282 | B2 | 2/2007 | Alferness et al. |
| 7,309,354 | B2 | 12/2007 | Mathis et al. |
| 7,311,729 | B2 | 12/2007 | Mathis et al. |
| 7,316,708 | B2 | 1/2008 | Gordon et al. |
| 7,351,260 | B2 | 4/2008 | Nieminen et al. |
| 7,503,931 | B2 | 3/2009 | Kowalsky et al. |
| 7,608,102 | B2 | 10/2009 | Adams et al. |
| 7,635,387 | B2 | 12/2009 | Reuter et al. |
| 7,674,287 | B2 | 3/2010 | Alferness et al. |
| 7,828,841 | B2 | 11/2010 | Mathis et al. |
| 7,828,842 | B2 | 11/2010 | Nieminen et al. |
| 7,837,729 | B2 | 11/2010 | Gordon et al. |
| 7,857,846 | B2 | 12/2010 | Alferness et al. |
| 7,966,177 | B2 | 6/2011 | Geiger |
| 8,062,358 | B2 | 11/2011 | Mathis et al. |
| 8,075,608 | B2 | 12/2011 | Gordon et al. |
| 8,172,898 | B2 | 5/2012 | Alferness et al. |
| 8,182,529 | B2 | 5/2012 | Gordon et al. |
| 8,223,156 | B2 | 7/2012 | Boss et al. |
| 8,439,971 | B2 | 5/2013 | Reuter et al. |
| 8,990,079 | B1 | 3/2015 | Newman |
| 9,607,612 | B2 | 3/2017 | Deleeuw |
| 10,022,011 | B2 | 7/2018 | Norton et al. |
| 10,062,004 | B2 | 8/2018 | Sugahara et al. |
| 10,198,068 | B2 | 2/2019 | Deleeuw |
| 10,684,683 | B2 | 6/2020 | Deleeuw |
| 2003/0083538 | A1 | 5/2003 | Adams et al. |
| 2003/0105520 | A1 | 6/2003 | Alferness et al. |
| 2003/0144697 | A1 | 7/2003 | Mathis et al. |
| 2003/0149566 | A1 | 8/2003 | Levin et al. |
| 2003/0212453 | A1 | 11/2003 | Mathis et al. |
| 2003/0225454 | A1 | 12/2003 | Mathis et al. |
| 2003/0236569 | A1 | 12/2003 | Mathis et al. |
| 2003/0236661 | A1 | 12/2003 | Burges et al. |
| 2004/0010305 | A1 | 1/2004 | Alferness et al. |
| 2004/0111095 | A1 | 6/2004 | Gordon et al. |
| 2004/0127980 | A1 | 7/2004 | Kowalsky et al. |
| 2004/0193260 | A1 | 9/2004 | Alferness et al. |
| 2004/0243228 | A1 | 12/2004 | Kowalsky et al. |
| 2004/0249452 | A1 | 12/2004 | Adams et al. |
| 2005/0004799 | A1 | 1/2005 | Lyudovyk |
| 2005/0021121 | A1 | 1/2005 | Reuter et al. |
| 2005/0096666 | A1 | 5/2005 | Gordon et al. |
| 2005/0119673 | A1 | 6/2005 | Gordon et al. |
| 2005/0125229 | A1* | 6/2005 | Kurzweil ............... G06Q 30/02 704/270 |
| 2005/0149180 | A1 | 7/2005 | Mathis et al. |
| 2005/0187619 | A1 | 8/2005 | Mathis et al. |
| 2005/0209690 | A1 | 9/2005 | Mathis et al. |
| 2005/0216077 | A1 | 9/2005 | Mathis et al. |
| 2005/0272969 | A1 | 12/2005 | Alferness et al. |
| 2006/0020335 | A1 | 1/2006 | Kowalsky et al. |
| 2006/0142854 | A1 | 6/2006 | Alferness et al. |
| 2006/0145944 | A1* | 7/2006 | Tarlton ............... H04M 1/72427 345/2.3 |
| 2006/0167544 | A1 | 7/2006 | Nieminen et al. |
| 2006/0173536 | A1 | 8/2006 | Mathis et al. |
| 2007/0038451 | A1 | 2/2007 | Cogne et al. |
| 2007/0055293 | A1 | 3/2007 | Alferness et al. |
| 2007/0066879 | A1 | 3/2007 | Mathis et al. |
| 2007/0225972 | A1 | 9/2007 | Kim |
| 2008/0096533 | A1 | 4/2008 | Manfredi et al. |
| 2008/0097594 | A1 | 4/2008 | Mathis et al. |
| 2008/0109059 | A1 | 5/2008 | Gordon et al. |
| 2008/0140191 | A1 | 6/2008 | Mathis et al. |
| 2008/0319542 | A1 | 12/2008 | Nieminen et al. |
| 2009/0271189 | A1 | 10/2009 | Agapi et al. |
| 2010/0079467 | A1 | 4/2010 | Boss et al. |
| 2010/0100175 | A1 | 4/2010 | Reuter et al. |
| 2010/0156781 | A1* | 6/2010 | Fahn ................ H04N 21/4788 345/156 |
| 2010/0168847 | A1 | 7/2010 | Alferness et al. |
| 2011/0015928 | A1 | 1/2011 | Odell et al. |
| 2011/0035000 | A1 | 2/2011 | Nieminen et al. |
| 2011/0066234 | A1 | 3/2011 | Gordon et al. |
| 2012/0257035 | A1 | 10/2012 | Larsen |
| 2012/0295708 | A1* | 11/2012 | Hernandez-Abrego ..................... G06F 3/167 463/36 |
| 2013/0005443 | A1 | 1/2013 | Kosta et al. |
| 2013/0005458 | A1 | 1/2013 | Kosta et al. |
| 2013/0005482 | A1 | 1/2013 | Kosta |
| 2013/0006709 | A1 | 1/2013 | Kosta |
| 2014/0184550 | A1* | 7/2014 | Hennessey ............ G06F 3/013 345/173 |
| 2014/0225901 | A1* | 8/2014 | Shuster .................. G06T 13/40 345/474 |
| 2014/0267311 | A1* | 9/2014 | Evertt .................. G06F 3/011 345/473 |
| 2016/0063989 | A1 | 3/2016 | Deleeuw |
| 2016/0210503 | A1* | 7/2016 | Yin .................. G06K 9/00335 |
| 2017/0039751 | A1 | 2/2017 | Tong et al. |
| 2017/0177080 | A1 | 6/2017 | Deleeuw |
| 2019/0227623 | A1 | 7/2019 | Deleeuw |

FOREIGN PATENT DOCUMENTS

| | | |
|---|---|---|
| CN | 1343968 A | 4/2002 |
| CN | 101292282 A | 10/2008 |
| CN | 101939740 A | 1/2011 |
| CN | 102129292 A | 7/2011 |
| JP | 2012221498 A | 11/2012 |

OTHER PUBLICATIONS

"Eye tracking," Wikipedia, The Free Encyclopedia, retrieved from: http://en.wikipedia.org/w/index.phptitle=Eye.sub--tracking oldid=52-3123367, edited Nov. 15, 2012, 7 pages.

"Automated online assistant," Wikipedia, The Free Encyclopedia, retrieved from: http://en.wikipedia.org/w/index.phptitle=Automated.sub.-onlin- e.sub.-assistant oldid=521739395, edited Nov. 6, 2012, 3 pages.

(56) References Cited

OTHER PUBLICATIONS

"Intelligent personal assistant," Wikipedia, The Free Encyclopedia, retrieved from: http://en.wikipedia.org/w/index.phptitle=Intelligent.sub.-personal.-sub.--assistant oldid=520490140, edited Oct. 29, 2012, 2 pages.
International Searching Authority, "International Search Report and Written Opinion," issued in connection with International Patent Application No. PCT/US2013/041866, dated Feb. 28, 2014, 19 pages.
Chinese Patent Office, "First Office Action," issued in connection with Chinese Patent Application No. 201380075764, dated Mar. 22, 2018, 24 pages (includes English translation).
Chinese Patent Office, "Second Office Action," issued in connection with Chinese Patent Application No. 201380075764, dated Sep. 5, 2018, 5 pages. (English translation provided at NPL document 22.).
The International Bureau of WIPO, "International Preliminary Report on Patentability," issued in connection with international Patent Application No. PCT/US2013/041866, dated Nov. 24, 2015, 12 pages.
United States Patent and Trademark Office, "Non-Final Office Action," issued in connection with U.S. Appl. No. 16/257,347, dated May 2, 2019, 6 pages.
United States Patent and Trademark Office, "Final Office Action," issued in connection with U.S. Appl. No. 16/257,347, dated Oct. 29, 2019, 7 pages.
United States Patent and Trademark Office, "Notice of Allowance and Fee(s) Due," issued in connection with U.S. Appl. No. 16/257,347, dated Feb. 12, 2020, 7 pages.
United States Patent and Trademark Office, "Corrected Notice of Allowabilty," issued in connection with U.S. Appl. No. 16/257,347, dated Apr. 9, 2020, 2 pages.
United States Patent and Trademark Office, "Non-Final Office Action," issued in connection with U.S. Appl. No. 15/452,131, dated May 17, 2018, 6 pages.
United States Patent and Trademark Office, "Notice of Allowance and Fee(s) Due," issued in connection with U.S. Appl. No. 15/452,131, dated Sep. 25, 2018, 7 pages.
United States Patent and Trademark Office, "Notice of Allowance and Fee(s) Due," issued in connection with U.S. Appl. No. 15/452,131, dated Oct. 17, 2018, 2 pages.
United States Patent and Trademark Office, "Non-Final Office Action," issued in connection with U.S. Appl. No. 14/129,435, dated Feb. 16, 2016, 9 pages.
United States Patent and Trademark Office, "Final Office Action," issued in connection with U.S. Appl. No. 14/129,435, dated Jun. 23, 2016, 16 pages.
United States Patent and Trademark Office, "Notice of Allowance and Fee(s) Due", issued in connection with U.S. Appl. No. 14/129,435, dated Nov. 16, 2016, 13 pages.
Chinese Patent Office, "Search Report," issued in connection with Chinese Patent Application No. 2013800757640 dated Mar. 14, 2018, 2 pages.
Chinese Patent Office, English Translation of "Supplemental Search Report," issued in connection with Chinese Patent Application No. 2013800757640 dated Aug. 8, 2018, 2 pages.
Chinese Patent Office, "Notification to Grant Patent Right for Invention," issued in connection with Chinese Patent Application No. 2013800757640, dated Mar. 25, 2019, 4 pages (includes English translation).
Chinese Patent Office, English Translation of "Second Office Action," issued in connection with Chinese Patent Application No. 201380075764, dated Sep. 5, 2018, 5 pages.

* cited by examiner

NATURAL HUMAN-COMPUTER INTERACTION FOR VIRTUAL PERSONAL ASSISTANT SYSTEMS

CROSS REFERENCE TO RELATED APPLICATIONS

This application arises from a continuation of U.S. patent application Ser. No. 16/257,347, now U.S. Pat. No. 10,684,683, entitled "NATURAL HUMAN-COMPUTER INTERACTION FOR VIRTUAL PERSONAL ASSISTANT SYSTEMS," and filed on Jan. 25, 2019. U.S. patent application Ser. No. 16/257,347 arises from a continuation of U.S. patent application Ser. No. 15/452,131, now U.S. Pat. No. 10,198,069, entitled "NATURAL HUMAN-COMPUTER INTERACTION FOR VIRTUAL PERSONAL ASSISTANT SYSTEMS," and filed on Mar. 7, 2017, U.S. patent application Ser. No. 15/452,131 arises from a divisional of U.S. patent application Ser. No. 14/129,435, now U.S. Pat. No. 9,607,612, entitled "NATURAL HUMAN-COMPUTER INTERACTION FOR VIRTUAL PERSONAL ASSISTANT SYSTEMS," and filed on Dec. 26, 2013, and which U.S. patent application Ser. No. 14/129,435 is a national stage entry under 35 USC §371(b) of International Patent Application No. PCT/US2013/041866, entitled "NATURAL HUMAN-COMPUTER INTERACTION FOR VIRTUAL PERSONAL ASSISTANT SYSTEMS," and filed May 20, 2013. U.S. patent application Ser. No. 16/257,347; U.S. patent application Ser. No. 15/452,131; U.S. patent application Ser. No. 14/129,435; and International Patent Application No. PCT/US2013/041866 are hereby incorporated by reference in their entireties.

BACKGROUND

Virtual personal assistants are artificial intelligence systems that perform tasks on a computing device in response to natural-language requests from a user. For example, a virtual personal assistant may handle calendaring, reminders, and messaging tasks for the user. To interact with the virtual personal assistant, the user typically enters a predefined input sequence on the computing device, for example pressing a dedicated hardware button or speaking a predefined code word. The user may enter natural-language requests through conventional text input or through speech recognition.

To further facilitate natural interaction, many virtual personal assistants display a humanlike character, also known as an avatar, to serve as a main point of interaction with the user. The avatar may occupy or obscure a significant portion of the display of the computing device. Further, the avatar may interfere with use of other applications on the computing device, particularly when the user did not intend to activate the avatar. Even when displaying a humanlike avatar, typical systems may not fully model natural human interaction, and instead may require conventional human-computer interactions such as button presses, mouse clicks, or the like.

Speech recognition systems convert spoken utterances of the user into computer-readable representations of text. Typical speech recognition systems attempt to determine a single most-likely speech recognition result for a given audio input. Such systems may filter out noise or otherwise attempt to enhance the audio input signal in order to improve speech recognition results. Some systems may provide a small number of alternative results; however, these results are typically only slight variations on each other. Typical speech recognition engines may be implemented as components of a local computing device, or as services provided by a server computing device.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
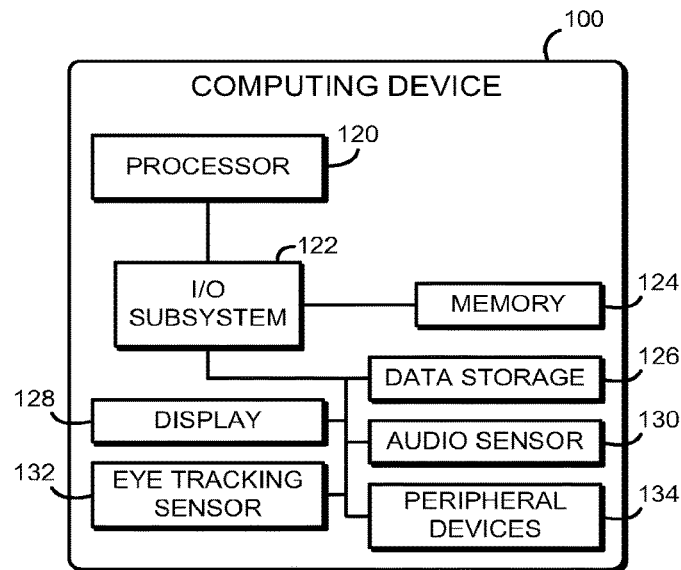
FIG. 1 is a simplified block diagram of at least one embodiment of a computing device for natural interaction with a virtual personal assistant.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, an illustrative computing device 100 for natural interaction with a virtual personal assistant includes a processor 120, an I/O subsystem 122, and memory 124. The computing device 100 captures audio input and obtains speech recognition results from a speech recognition engine that are based on distortions applied to the audio input. The applied distortions may result in multiple, semantically distinct variations of the audio input. Supplying multiple variations may allow for the speech recognition engine to produce many more potential speech recognition results, which in turn may increase speech recognition accuracy. The speech recognition engine may operate on the computing device 100, or in some embodiments, on a remote speech recognition server as discussed in more detail below. The speech recognition results may be used to control a virtual personal assistant. The virtual personal assistant models the engagement level of the user by tracking the user's visual focus and/or by interpreting the user's speech. Modeling user engagement may allow the virtual personal assistant to engage in more-natural human interactions; for example, the virtual personal assistant may better determine when it is being addressed by the user or when the user has moved on to some other task. The virtual personal assistant may represent the engagement level of the user by adjusting the size, position, and/or transparency of an avatar on a display screen. Rendering the engagement level in this manner may also facilitate natural interaction by allowing the user to better understand the state of the virtual personal assistant without unnecessarily interrupting the user's other work.

The computing device 100 may be embodied as any type of device capable of performing the functions described herein. For example, the computing device 100 may be embodied as, without limitation, a smartphone, a cellular phone, a tablet computer, a notebook computer, a laptop computer, a desktop computer, a distributed computing system, a multiprocessor system, a consumer electronic device, a smart appliance, and/or any other computing device capable of recognizing spoken user commands. As shown in FIG. 1, the illustrative computing device 100 includes the processor 120, the I/O subsystem 122, the memory 124, and a data storage device 126. Of course, the computing device 100 may include other or additional components, such as those commonly found in a portable computer (e.g., various input/output devices), in other embodiments. Additionally, in some embodiments, one or more of the illustrative components may be incorporated in, or otherwise from a portion of, another component. For example, the memory 124, or portions thereof, may be incorporated in the processor 120 in some embodiments.

The processor 120 may be embodied as any type of processor currently known or developed in the future and capable of performing the functions described herein. For example, the processor may be embodied as a single or multi-core processor(s), digital signal processor, microcontroller, or other processor or processing/controlling circuit. Similarly, the memory 124 may be embodied as any type of volatile or non-volatile memory or data storage currently known or developed in the future and capable of performing the functions described herein. In operation, the memory 124 may store various data and software used during operation of the computing device 100 such as operating systems, applications, programs, libraries, and drivers. The memory 124 is communicatively coupled to the processor 120 via the I/O subsystem 122, which may be embodied as circuitry and/or components to facilitate input/output operations with the processor 120, the memory 124, and other components of the computing device 100. For example, the I/O subsystem 122 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 122 may form a portion of a system-on-a-chip (SoC) and be incorporated, along with the processor 120, the memory 124, and other components of the computing device 100, on a single integrated circuit chip.

The data storage 126 may be embodied as any type of device or devices configured for short-term or long-term storage of data such as, for example, memory devices and circuits, memory cards, hard disk drives, solid-state drives, or other data storage devices. The data storage 126 may store program and data files relating to the virtual personal assistant, and may serve as temporary or permanent storage for audio data captured by the computing device 100.

The computing device 100 further includes a display 128, an audio sensor 130, and an eye tracking sensor 132. The display 128 of the computing device 100 may be embodied as any type of display capable of displaying digital information such as a liquid crystal display (LCD), a light emitting diode (LED), a plasma display, a cathode ray tube (CRT), or other type of display device. In some embodiments, the display 128 may be coupled to a touch screen to receive user input.

The audio sensor 130 may be embodied as any sensor capable of capturing audio signals such as a microphone, a line input jack, an analog-to-digital converter (ADC), or other type of audio sensor. The audio sensor 130 may be used by the computing device 100 to detect speech commands uttered by the user, as described below.

The eye tracking sensor 132 may be embodied as any one or more sensors capable of determining an area on the display 128 of the computing device 100 on which the user's eyes are focused. For example, the eye tracking sensor 132 may be embodied as a digital camera or a digital depth camera capable of tracking the focus of the user's gaze. In other embodiments, the eye tracking sensor 132 may be embodied as active infrared emitters and infrared detectors capable of tracking the user's eye movements over time. In those embodiments, the eye tracking sensor 132 may capture the infrared light reflected off of various internal and external features of the user's eye and thereby calculate the direction of the user's gaze. The eye tracking sensor 132 may also be capable of determining the position of the user's head in three-dimensional space. In some embodiments, an eye tracking sensor 132 such as a depth camera may be capable of determining head position data directly. In other embodiments, the eye tracking sensor 132 may be used with another sensor such as a video camera to calculate the position of the user's head.

In some embodiments, the computing device 100 may also include one or more peripheral devices 134. The peripheral devices 134 may include any number of additional sensors, input/output devices, interface devices, and/or other peripheral devices. For example, in some embodiments, the peripheral devices 134 may include a touch screen, graphics circuitry, keyboard, mouse, speaker system, interface devices, and/or other input/output devices. In some embodiments, the peripheral devices 134 may be used along with the eye tracking sensor 132 and/or the audio sensor 130 to determine the user's engagement level. As another example, in some embodiments, the peripheral devices 134 may include a communication circuit, device, or collection thereof capable of enabling communications between the computing device 100 and other remote servers and/or devices.

Figure 2:
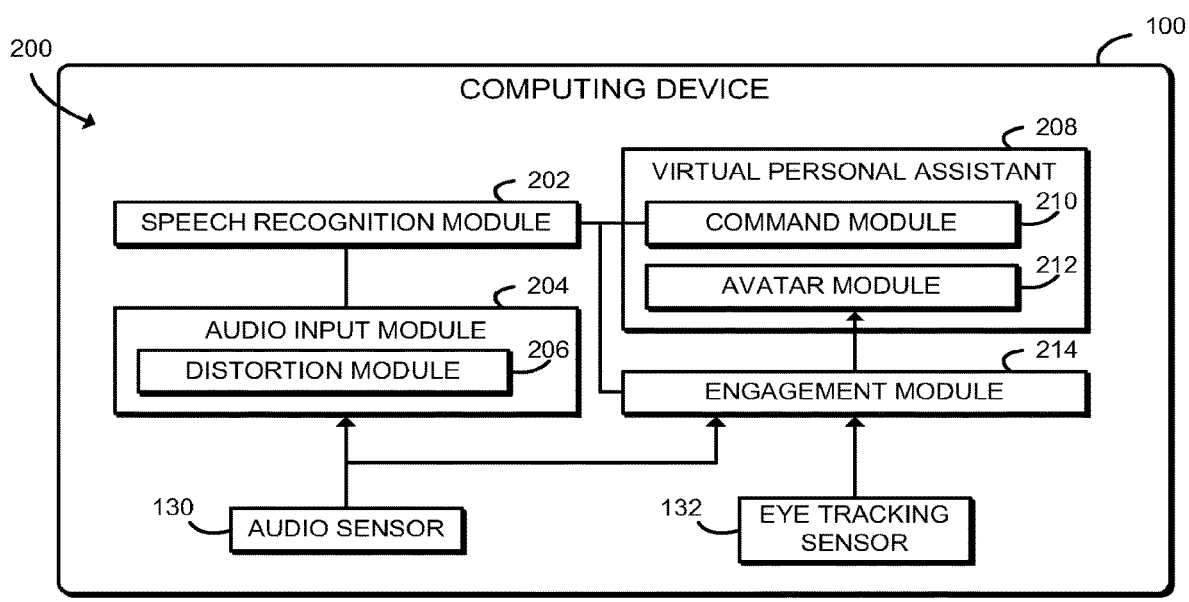
FIG. 2 is a simplified block diagram of at least one embodiment of an environment of the computing device of FIG. 1.

Referring now to FIG. 2, in one embodiment, the computing device 100 establishes an environment 200 during operation. The illustrative embodiment 200 includes a speech recognition module 202, an audio input module 204, a virtual personal assistant 208, and an engagement module 214. The various modules of the environment 200 may be embodied as hardware, firmware, software, or a combination thereof.

The speech recognition module 202 is configured to perform speech recognition on audio input data received from the audio input module 204. The speech recognition module 202 ranks and filters speech recognition results to produce a single result or a ranked list of likely results. The speech recognition module 202 may use a speech recognition grammar provided by an application such as the virtual personal assistant 208 to rank and filter speech recognition results. In some embodiments, the speech recognition module 202 may recognize speech in a dictation or free speech mode. The dictation or free speech mode may use a full natural language vocabulary and grammar to recognize results, and thus may produce additional likely speech recognition results.

The audio input module 204 captures audio input data from the audio sensor 130 and applies audio distortions to the audio input data to produce multiple variations of the audio input. The audio distortions may modify amplitude, frequency, duration, and/or other characteristics of the audio input to produce semantic variation among the distorted audio variations. The audio input module 204 provides the distorted audio variations to the speech recognition module 202. In some embodiments, those functions may be performed by sub-modules, for example, by a distortion module 206. Additionally, in some embodiments, the functionality of the speech recognition module 202 and/or the distortion module 206 may be performed by a remote server, for example by a cloud service, as described below in connection with FIG. 3.

The virtual personal assistant 208 responds to spoken user commands and displays an avatar on the display 128 to provide information on the status of the virtual personal assistant 208. The virtual personal assistant 208 may maintain a speech recognition grammar defining spoken commands that may be accepted from the user, including command vocabulary and syntax. The avatar is a character or other visual representation of the virtual personal assistant 208. The avatar may include human-like characteristics such as facial features or a human form. Those human-like features may facilitate natural interaction with the user. In some embodiments, those functions may be performed by sub-modules, for example a command module 210 or an avatar module 212. In some embodiments, the virtual personal assistant 208 may be used without speech recognition; that is, the virtual personal assistant 208 may respond to non-speech input such as typed input or input gestures.

The engagement module 214 determines the user's level of engagement with the virtual personal assistant 208 based on sensor data received from the eye tracking sensor 132 and/or the audio sensor 130. For example, the engagement module 214 may determine the level of engagement based on how long or how often the user's eyes focus on the avatar. In some embodiments, the engagement module 214 may also analyze speech recognition results from the speech recognition module 202 to determine the user's level of engagement. The engagement module 214 provides the engagement level to the virtual personal assistant 208, allowing the virtual personal assistant 208 to modify the avatar accordingly.

Figure 3:
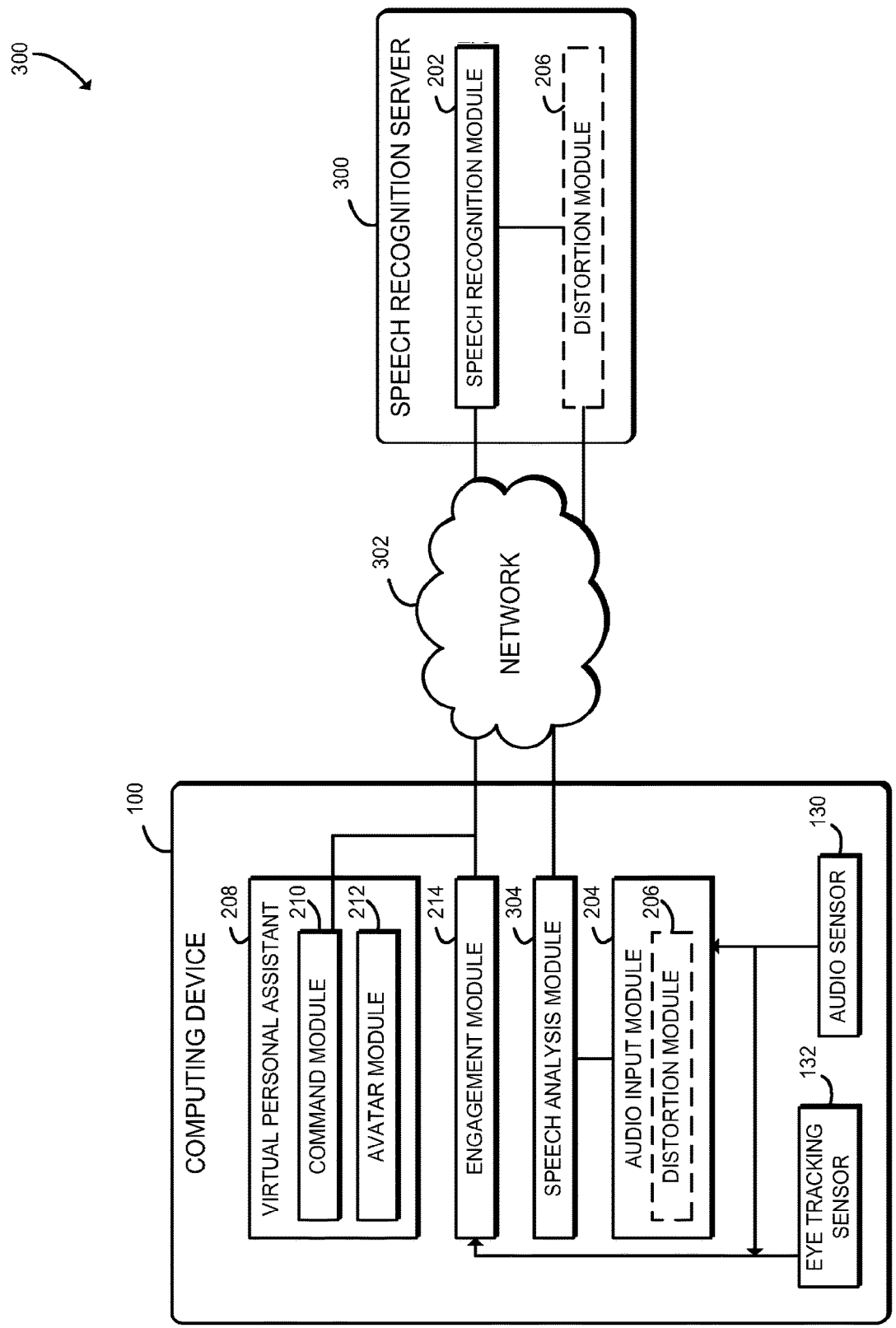
FIG. 3 is a simplified block diagram of at least one embodiment of system for natural interaction with a virtual personal assistant.

Referring now to FIG. 3, in some embodiments, the speech recognition module 202 and/or the distortion module 206 may be embodied in a remote speech recognition server 300. The speech recognition server 300 is configured to provide services including performing speech recognition analysis on audio input transmitted from the computing device 100 over a network 302. The speech recognition server 300 may be embodied as any type of server computing device, or collection of devices, capable of performing the functions described herein. As such, the speech recognition server 300 may include components and features similar to the computing device 100 such as a processor, I/O subsystem, memory, data storage, communication circuitry, and various peripheral devices, which are not illustrated in FIG. 3 for clarity of the present description. Further, the speech recognition server 300 may be embodied as a single server computing device or a collection of servers and associated devices. For example, in some embodiments, the speech recognition server 300 may be embodied as a "virtual server" formed from multiple computing devices distributed across a network and operating in a public or private cloud. Accordingly, although the speech recognition server 300 is illustrated in FIG. 3 and described below as embodied as a single server computing device, it should be appreciated that the speech recognition server 300 may be embodied as multiple devices cooperating together to facilitate the functionality described below.

As discussed above, the speech recognition module 202 and, in some embodiments, the audio distortion module 206 are established on the speech recognition server 300 (i.e., rather than, or in addition to, the computing device 100). The computing device 100 includes the audio input module 204, the virtual personal assistant 208, the engagement module 214, and in some embodiments, the distortion module 206. The various modules of the speech recognition server 300 and the computing device 100 perform the same functions as the modules described above in connection with FIG. 2, and may be embodied as hardware, firmware, software, or a combination thereof.

The illustrative computing device 100 of FIG. 3 further includes a speech analysis module 304. The speech analysis module 304 is configured to transmit the audio input, and in some embodiments, the distorted audio variations to the speech recognition server 300. The speech analysis module 304 is also configured to receive speech recognition results from the speech recognition server 300 and may select a result from the speech recognition results based on contextual information.

In embodiments in which the speech recognition module 202 and the distortion module 206 are located on the speech recognition server 300, the audio input module 204 of the computing device 100 captures audio input from the audio sensor 130, and the speech analysis module 304 sends the audio input to the speech recognition server 300. In such embodiments, the distortion module 206 of the speech recognition server 300 receives the audio input and applies audio distortions to the audio input data to produce multiple variations of the audio input, as described above with regard to the computing device 100. The audio input and the distorted audio variations are provided to the speech recognition module 202 of the speech recognition server 300, which performs speech recognition as described above. The speech recognition module 202 subsequently transmits the speech recognition results back to the computing device 100. The speech recognition module 202 may transmit a list of speech recognition results, or may transmit a single result.

Alternatively, in embodiments in which only the speech recognition module 202 is located on the speech recognition server 300, the audio input module 204 of the computing device 100 captures audio input from the audio sensor 130 and the distortion module 206 of the computing device 100 applies audio distortions to the audio input data to produce multiple variations of the audio input, as described above. In such embodiments, the computing device 100 transmits the audio input and the distorted audio variations to the speech recognition server 300. The audio input and the distorted audio variations are received by the speech recognition module 202 of the speech recognition server 300, which performs speech recognition as described above. The speech recognition module 202 transmits the speech recognition results back to the computing device 100. The speech recognition module 202 may transmit a list of speech recognition results, or may transmit a single result.

Figure 4:
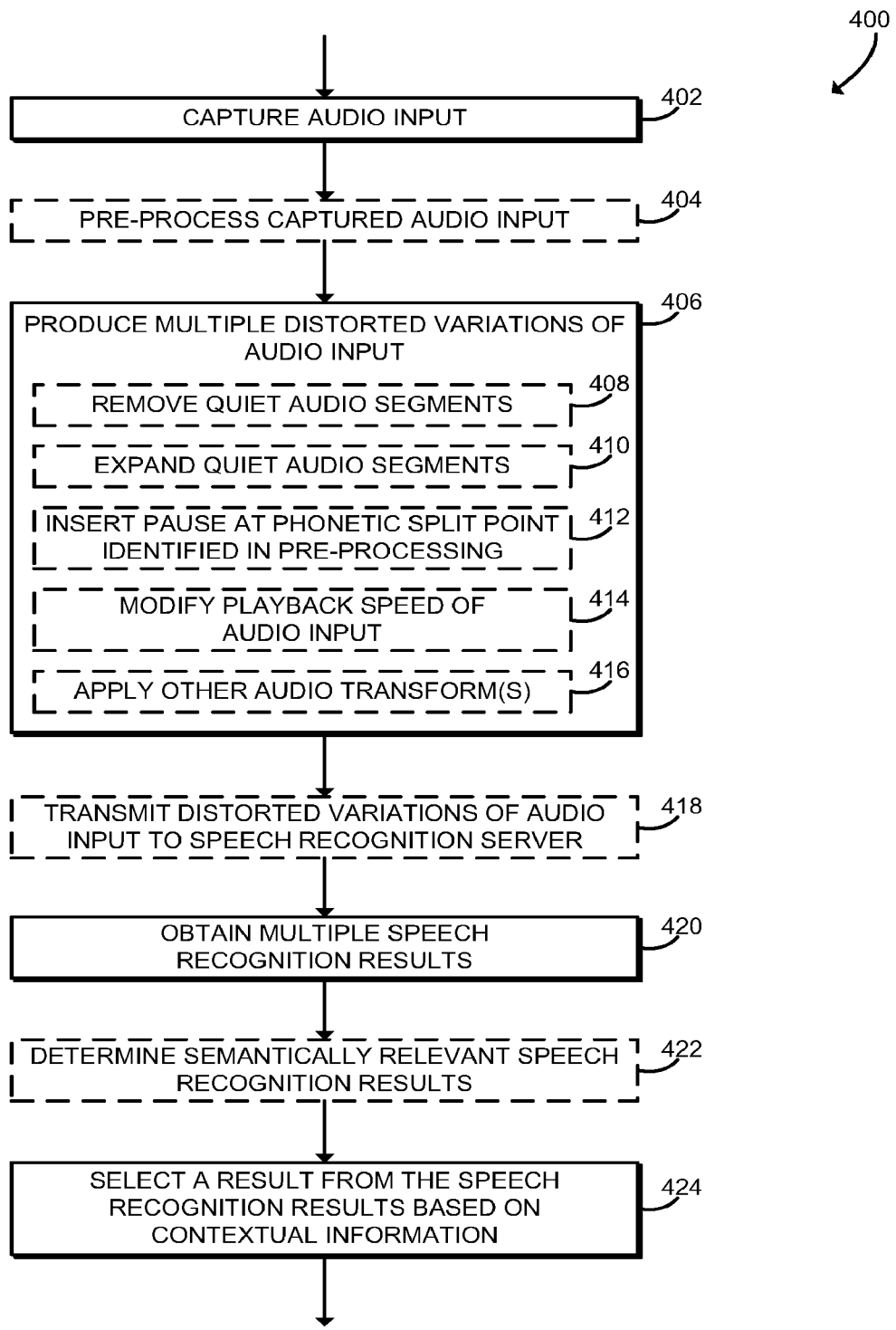
FIG. 4 is a simplified flow diagram of at least one embodiment of a method for introducing audio distortion to improve speech recognition that may be executed by the computing device of FIGS. 1 and 2.

Referring now to FIG. 4, in use, the computing device 100 may execute a method 400 for introducing audio distortion to improve speech recognition. The method 400 begins with block 402, in which the computing device 100 captures audio input using the audio sensor 130. The audio input may be stored in any format useable for further analysis and manipulation, including compressed or uncompressed formats. Audio capture may be initiated based on a request from the user or based on a request from a component of the computing device 100. For example, audio capture may be initiated when the user activates or engages the virtual personal assistant 208, as further described below.

In block 404, in some embodiments the computing device 100 may pre-process the captured audio input. As part of pre-processing, the computing device 100 may perform speech recognition on the captured audio input. The speech recognition results from pre-processing may be used to control distortion of the audio input, as described below.

In block 406, the computing device 100 distorts the audio input to produce multiple distorted variations of the audio input. The audio input is distorted in ways that may produce different and semantically varied versions of the audio input. The distortions may modify, for example, the amplitude, timing, pitch, or any other salient characteristic of the audio input. The computing device 100 may apply the distortions individually or in various combinations. Each variation may be stored as separate audio data, or the computing device 100 may apply distortions to the original audio input as needed.

For example, in some embodiments, the computing device 100 may remove quiet audio segments from the audio input in block 408. To do so, the computing device 100 may identify internal segments of the audio input (that is, segments that are not at the beginning or the end of the audio input) having an amplitude below a threshold amplitude and delete those internal segments from the audio input. After removing a quiet segment, segments of the audio input that were formerly on either side of the quiet segment are appended together or otherwise run together. Therefore, this distortion may eliminate pauses between utterances spoken by the user, which may combine the utterances into a single word.

In some embodiments, the computing device 100 may expand quiet audio segments in the audio input in block 410. To do so, the computing device 100 may identify segments of the audio input having an amplitude below a threshold amplitude and increase the duration of those segments. After expanding the quiet segments, neighboring segments of the audio input are spaced further apart. Therefore, this distortion may increase the duration of pauses between utterances spoken by the user, which may split the utterances into two distinct words.

In some embodiments, the computing device 100 may insert pauses at one or more phonetic split points in the audio input identified in pre-processing in block 412. As with quiet audio segment expansion, this distortion may split utterances of the user into distinct words. Unlike quiet audio expansion, this distortion does not require an existing pause or quiet audio segment.

In some embodiments, in block 414, the computing device 100 may modify the playback speed of the audio input; that is, the computing device 100 may speed up or slow down the audio input. In some embodiments, in block 416, the computing device 100 may apply other audio transformations to the audio input. For example, the computing device 100 may alter the pitch of the audio input or mix the audio input with random noise. Such distortions may produce variation in speech recognition results. Of course, the computing device 100 may apply additional or other distortions to the audio input.

In block 418, in embodiments in which the speech recognition module 202 is located on the remote speech recognition server 300, the computing device 100 may transmit the audio input and the multiple distorted audio variations to the speech recognition server 302. As described above, the speech recognition server may provide speech recognition services. Offloading speech recognition tasks to the speech recognition server 302 may improve efficiency for a computing device 100 having limited computational power, for example, a smartphone.

After applying the various distortions to produce multiple variations of the audio input, the computing device 100 obtains speech recognition results based on the audio input and all of the multiple distorted audio variations in block 420. For example, in embodiments in which the speech recognition module 202 is located on the mobile computing device 100, the device 100 may perform speech recognition locally. In those embodiments, the computing device 100 may re-use or reference speech recognition results created while pre-processing the audio input in block 404 and perform speech recognition in block 420 on only the distorted audio variations. In other embodiments in which the speech recognition module 202 is located on the speech recognition server 300, the computing device 100 may receive speech recognition results from the speech recognition server 300. However the speech recognition results are obtained, the speech recognition process produces multiple speech recognition results; that is, multiple potential interpretations of the captured audio input. In some embodiments, the speech recognition process may produce a large number of speech recognition results; for example, hundreds or thousands of speech recognition results may be produced. In some embodiments, the speech recognition results may be generated using a conventional speech recognition engine supplied with the multiple variations of the audio input repeatedly or in parallel.

In block 422, in some embodiments, the computing device 100 may determine semantically relevant speech recognition results from among the full speech recognition results produced in block 420. In other words, the computing device 100 may analyze the speech recognition results to find results that it "understands" and to reject results that do not "make sense." For example, an application of the computing device 100 such as the virtual personal assistant 208 may include a speech recognition grammar. The speech recognition grammar may include a set of actions, data objects, and other commands understood by the application. The computing device 100 may determine semantically relevant speech recognition results by accepting only those results that satisfy the speech recognition grammar.

In block 424, the computing device 100 selects a result from speech recognition results based on contextual information. In some embodiments, the result may be selected from the smaller set of semantically relevant speech recognition results determined in block 422. The selected result may be the speech recognition result most relevant to the current context of the user and/or the computing device 100. The most relevant speech recognition result is most likely to be the result intended by the user. The contextual information includes any information that may reveal the intent of the user, and may include the state of any applications currently executing on the computing device 100, such as web browsers, productivity applications, or the virtual personal assistant 208. The contextual information may also include contextual information associated with the user, such as a calendar, contact list, email account, or other personalized data. The contextual information may further include basic contextual information of the computing device 100 such as date, time, or location. Although illustrated as selecting a single result from the speech recognition results, in some embodiments the computing device 100 may produce a list of speech recognition results, which list may be sorted based on the contextual information. After selecting a result, the method 400 is completed and control may be passed to a calling method that may operate on the speech recognition results. For example, as described below, the virtual personal assistant 208 may act on the speech recognition results.

Figure 5:
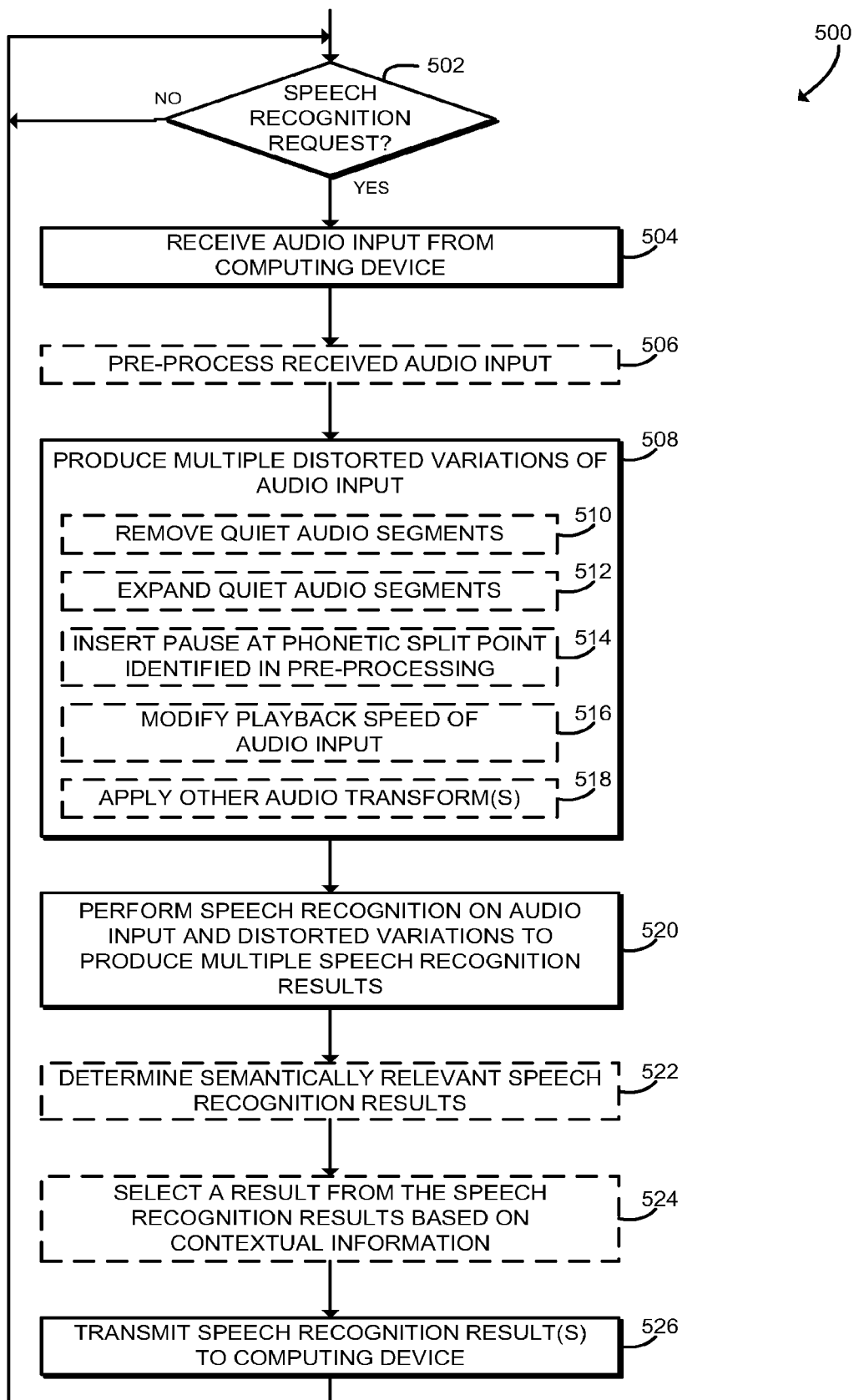
FIG. 5 is a simplified flow diagram of at least one embodiment of a method for introducing audio distortion to improve speech recognition that may be executed by the speech recognition server of FIG. 4.

Referring now to FIG. 5, in embodiments in which the speech recognition module 202 and/or the distortion module 206 are located on the speech recognition server 300, the speech recognition server 300 may execute a method 500 for introducing audio distortion to improve speech recognition. The method 500 begins with block 502, in which the speech recognition server 302 determines whether a request for speech recognition has been received from a computing device 100. If not, the method 500 loops back to block 502 to continue listening for speech recognition requests. However, if a request has been received, the method 500 advances to block 504 in which the speech recognition server 300 receives audio input from computing device 100. The audio input was previously captured by the computing device 100 using the audio sensor 130. The audio input may be stored in any format useable for further analysis and manipulation, including compressed or uncompressed formats.

In block 506, in some embodiments the speech recognition server 300 may pre-process the received audio input. As part of pre-processing, the speech recognition server 300 may perform speech recognition on the received audio input. The speech recognition results from pre-processing may be used to control distortion of the audio input, as described below.

In block 508, the speech recognition server 300 distorts the audio input to produce multiple distorted variations of the audio input. The audio input is distorted in ways that may produce different and semantically varied versions of the audio input. The distortions may modify, for example, the amplitude, timing, pitch, or any other salient characteristic of the audio input. The speech recognition server 300 may apply the distortions individually or in various combinations. Each variation may be stored as separate audio data, or the speech recognition server 300 may apply distortions to the original audio input as needed.

For example, in some embodiments, the speech recognition server 300 may remove quiet audio segments from the audio input in block 510, expand quiet audio segments in the audio input in block 512, insert pauses at one or more phonetic split points in the audio input identified in pre-processing in block 514, modify the playback speed of the audio input in block 516, and/or apply other audio transforms to the audio input in block 518 as described in detail above with regard to computing device 100 and block 406 of method 400. Of course, the speech recognition server 300 may apply additional or other distortions to the audio input. Regardless, after applying the various distortions to produce multiple variations of the audio input, the speech recognition server 300 performs speech recognition on the audio input and all of the multiple distorted audio variations in block 520. In some embodiments, the speech recognition server 300 may re-use or reference speech recognition results created while pre-processing the audio input in block 506 and perform speech recognition in block 520 on only the distorted audio variations. The speech recognition process produces multiple speech recognition results; that is, multiple potential interpretations of the captured audio input. In some embodiments, the speech recognition process may produce a large number of speech recognition results; for example, hundreds or thousands of speech recognition results may be produced. In some embodiments, the speech recognition results may be generated using a conventional speech recognition engine supplied with the multiple variations of the audio input repeatedly or in parallel.

In block 522, in some embodiments, the speech recognition server 300 may determine semantically relevant speech recognition results from among the full speech recognition results produced in block 520. In other words, the speech recognition server 300 may analyze the speech recognition results to find results that it "understands" and to reject results that do not "make sense." For example, an application of the computing device 100 such as the virtual personal assistant 208 may include a speech recognition grammar. The speech recognition grammar may include a set of actions, data objects, and other commands understood by the application. The speech recognition server 300 may determine semantically relevant speech recognition results by accepting only those results that satisfy the speech recognition grammar of the virtual personal assistant 208.

In block 524, in some embodiments, the speech recognition server 300 may select a result from speech recognition results based on contextual information. For example, in some embodiments, the result may be selected from the smaller set of semantically relevant speech recognition results determined in block 522. The selected result may be the speech recognition result most relevant to the current context of the user and/or the computing device 100. The most relevant speech recognition result is most likely to be the result intended by the user. The contextual information may include any information that may reveal the intent of the user, and may include the state of any applications currently executing on the computing device 100, such as web browsers, productivity applications, or the virtual personal assistant 208. The contextual information may also include contextual information associated with the user, such as a calendar, contact list, email account, or other personalized data. The contextual information may further include basic contextual information of the computing device 100 such as date, time, or location. Although illustrated as selecting a single result from the speech recognition results, in some embodiments the speech recognition server 302 may produce a list of speech recognition results, which list may be sorted based on the contextual information.

In block 526, the speech recognition server 302 transmits the speech recognition result or speech recognition results back to the computing device 100. The computing device 100 may then use the speech recognition result or speech recognition results to control an application such as the virtual personal assistant 208. After transmitting, the method 500 loops back to block 502 to listen for further speech recognition requests from the computing device 100.

Figure 6A:
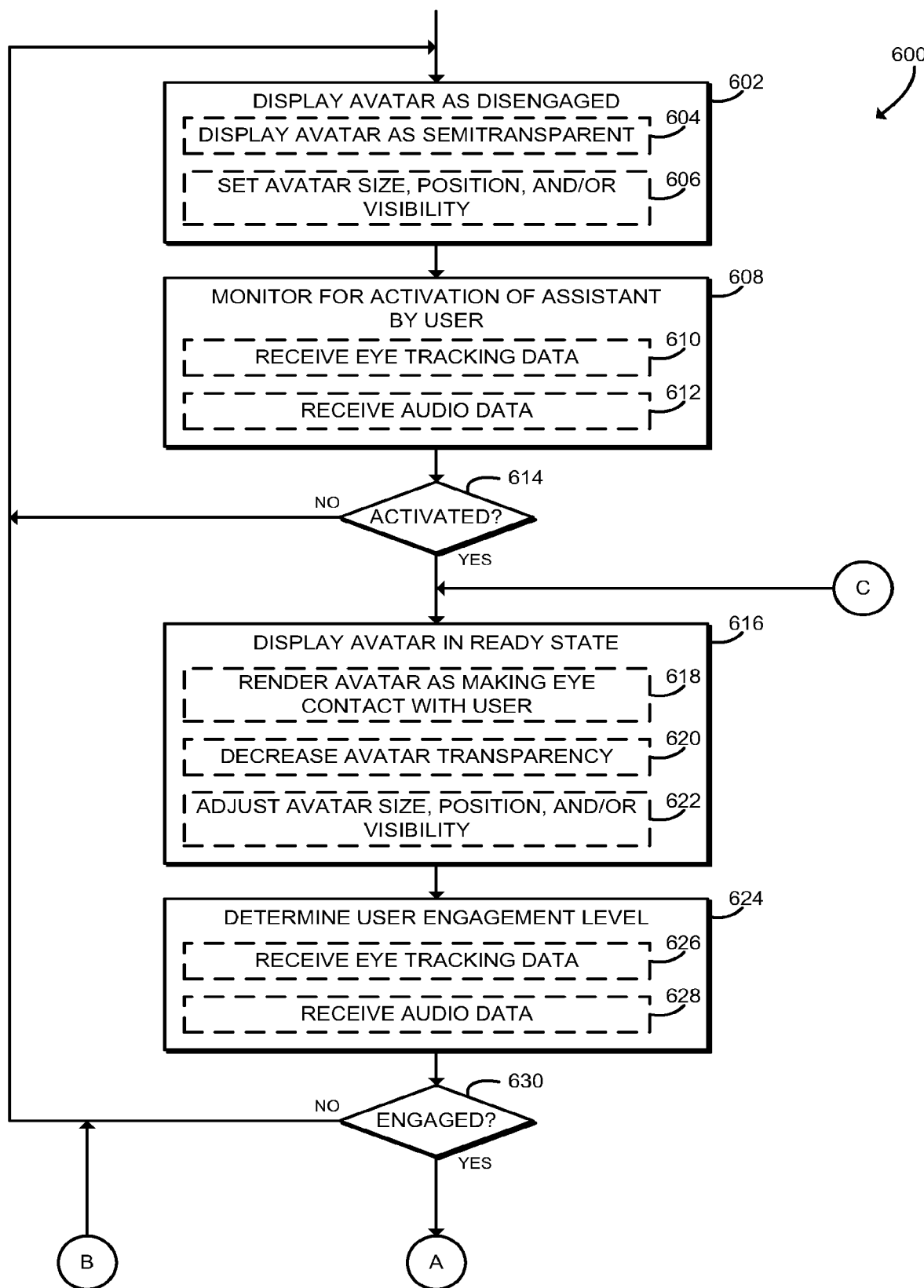
FIGS. 6A and 6B are a simplified flow diagram of at least one embodiment of a method for natural interaction with a virtual personal assistant that may be executed by the computing device of FIGS. 1 and 2.

Referring now to FIG. 6A, in use, the computing device 100 may execute a method 600 for natural interaction with the virtual personal assistant 208. The method 600 begins with block 602, in which an avatar of the virtual personal assistant 208 is displayed in a disengaged state on the display 128 of the computing device 100. As described above, the avatar is a visual representation of the virtual personal assistant 208. The avatar includes human-like or anthropomorphic features that may facilitate natural interaction with the user. For example, the avatar may include an animated human or human-like face including an eye or a pair of eyes. When in the disengaged state, the avatar is displayed in a manner that indicates that the virtual personal assistant 208 is idle and/or not actively listening to instructions. For example, the avatar may be represented as sleeping or looking away from the user.

In some embodiments, in block 604, the avatar may be displayed in the disengaged state as semitransparent, allowing background applications of the computing device 100 to shine through the avatar. When semitransparent, the avatar may remain visible to the user while still allowing all of the display 128 to be useable by other applications and at least partially visible to the user. The semitransparent appearance may be accomplished through alpha-blending the avatar and the other applications, compositing a scene, or by any other comparable technique for semitransparency. In some embodiments, in block 606, the avatar may be displayed in the disengaged state in a relatively small size or at a position away from the currently active application of the computing device 100. For example, the avatar may be rendered in a smaller size in a corner of the display 128, allowing the user to continue working in the active application without distraction. In other embodiments, the computing device 100 may render the avatar in the disengaged state as completely invisible. In those embodiments, all of the display 128 may be available for other applications; however, the user may not be presented with any visual cues indicating the virtual personal assistant 208 is available.

In block 608, the computing device 100 monitors for activation of the virtual personal assistant 208 by the user. In some embodiments, in block 610, the computing device 100 may receive eye tracking data from the eye tracking sensor 132. The computing device 100 interprets the eye tracking data to determine the position of the user's gaze on the display 128. The user may indicate activation of the virtual personal assistant 208 by focusing on the position of the avatar currently displayed in the disengaged state. The computing device 100 may filter the eye tracking data to remove brief or spurious glances at the avatar. In some embodiments, in block 612, the computing device 100 may receive audio input from the audio sensor 130. The computing device 100 interprets the audio input to determine whether the user has uttered a code word for activating the virtual personal assistant 208. For example, the code word may be embodied as the name of the virtual personal assistant 208, or a common word such as "assistant" or "computer."

In block 614, the computing device 100 determines whether the user has requested activation of the virtual personal assistant 208. As described above, activation may be requested when the user's gaze has focused on the avatar for a length of time longer than a certain threshold, or when the code word has been detected. If the user has not requested activation, the method 600 loops back to block 602, keeping the avatar in the disengaged state and continuing to monitor for activation. If the user has requested activation, the method 600 advances to block 616.

In block 616, the computing device 100 displays the avatar in a ready state. The ready state indicates to the user that the virtual personal assistant 208 is available and ready to respond to user input. In block 618, in some embodiments the computing device 100 may render the avatar as making eye contact with the user. Eye contact is a powerful cue that may naturally convey to the user that the virtual personal assistant 208 is ready for input. In some embodiments, the computing device 100 may simply render the avatar as facing straight out of the display 128, because the user is typically positioned in front of the display 128. In some embodiments, the computing device 100 may use eye tracking data received from the eye tracking sensor 132 to determine the location of the user's eyes and render the avatar as looking at the user's eyes. The computing device 100 may render eye contact using anthropomorphic cues to simulate natural interaction; for example, the computing device 100 may render the avatar as periodically glancing away from the user, which may make the user less likely to interpret the avatar as staring at the user. In some embodiments, in block 620 the avatar may be displayed in the ready state by decreasing the transparency of the avatar; that is, by making the avatar appear more solid. While still allowing background applications to shine through, the increasingly solid appearance of the avatar may indicate that the virtual personal assistant 208 is ready to receive commands. In block 622, in some embodiments the computing device 100 may display the avatar in the ready state by adjusting the position, size, and/or visibility of the avatar. For example, the avatar may be moved toward the active application on the display 128, may be increased in size, or may be made visible.

While the avatar is displayed in the ready state, in block 624 the computing device 100 determines the user's engagement level, that is, the level of interest the user is exhibiting in the avatar. By determining the user's engagement level, the computing device 100 may determine in a natural manner whether or not the user intended to activate the virtual personal assistant 208. In some embodiments, in block 626 the computing device 100 may receive eye tracking data from the eye tracking sensor 132. The computing device 100 may analyze the eye tracking data to determine whether the user has visually focused on the avatar. Visually focusing on the avatar may indicate a relatively high engagement level, and focusing away from the avatar may indicate relatively a low engagement level. The computing device 100 may require the user to visually focus on the avatar for a period of time greater than a threshold time, in order to filter out spurious glances. Similarly, the computing device 100 may ignore short glances away from the avatar to improve recognition performance, essentially applying a low-pass filter to the eye tracking data. In some embodiments, in block 628 the computing device 100 may receive audio input from the audio sensor 130. The computing device 100 may analyze the audio input to determine whether the user is addressing the virtual personal assistant 208. In some embodiments, the computing device 100 may perform speech recognition on the audio input.

In block 630, the computing device 100 determines whether the user is engaged with the avatar. The computing device 100 may determine whether user is engaged by comparing the user engagement level determined in block 624 with a threshold engagement level. If not the user is determined not to be engaged, the method 600 loops back to block 602 to render the avatar in the disengaged state. To summarize that interaction, the avatar has unobtrusively indicated to the user that it is ready for interaction, determined that the user is not engaged with the avatar, and then retreated away from the user's attention. Thus, that interaction may simulate a natural human interaction. Referring again to block 630, if the user is engaged with the avatar, the method 600 advances to block 632, illustrated in FIG. 6B.

Figure 6B:
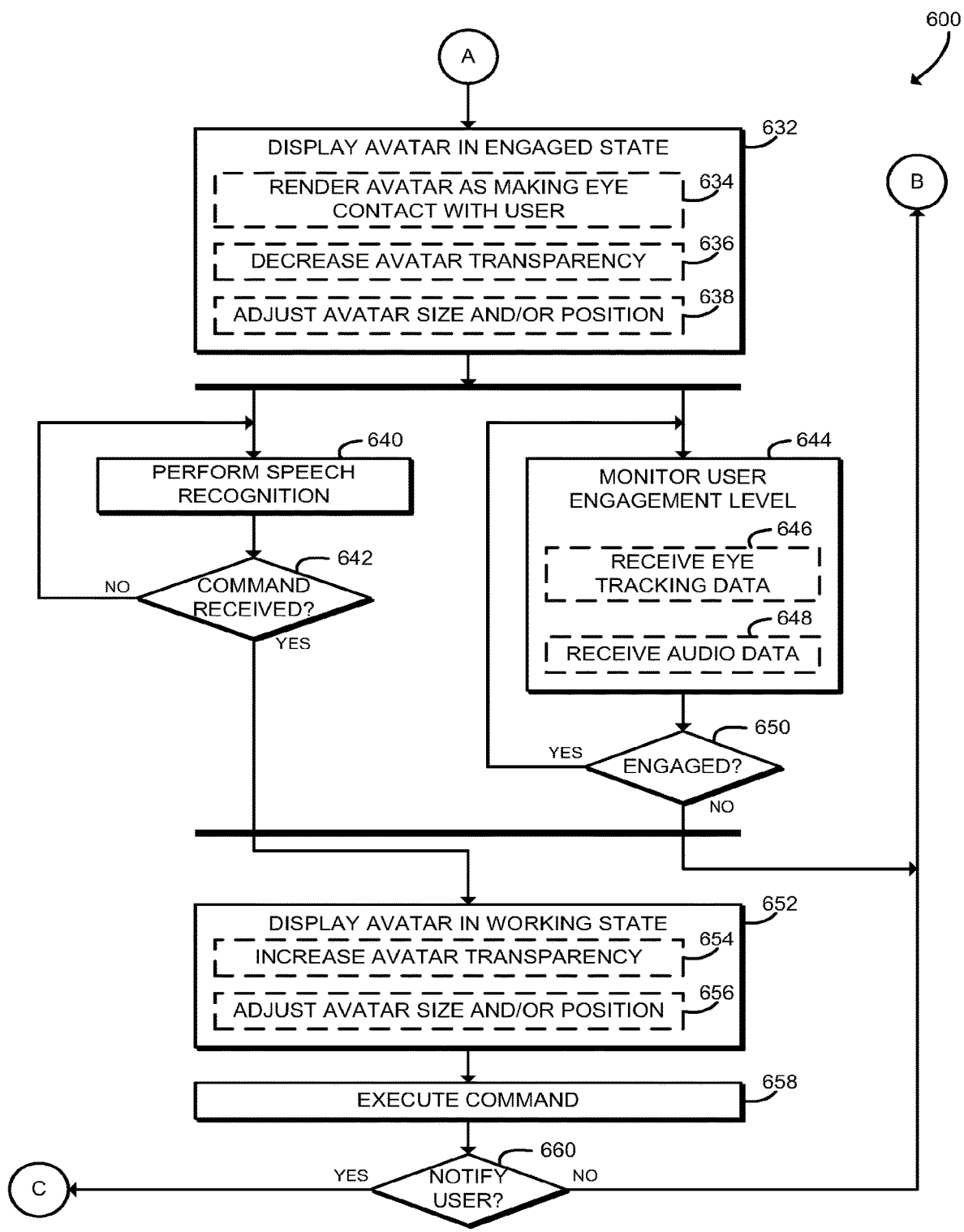

Referring now to FIG. 6B, in block 632 the computing device 100 displays the avatar in an engaged state. The engaged state indicates to the user that the virtual personal assistant 208 is actively interpreting commands issued by the user. For example, in some embodiments, the computing device 100 may render the avatar as making eye contact with the user in block 634. As described above in connection with block 618, the computing device 100 may receive eye tracking data from the eye tracking sensor 132 and render the avatar as looking toward the user's eyes. Additionally or alternatively, in some embodiments, the computing device 100 may decrease the transparency of the avatar in block 636. For example, the computing device 100 may render the avatar as fully opaque in some embodiments. Further, in some embodiments, the computing device 100 may adjust the size and/or position of the avatar in block 638. For example, the avatar may be rendered close to or in front of the currently-active application on the display 128, or the avatar may be increased in size. In some embodiments, although the avatar is displayed as opaque and in front of other applications on the display 128, the avatar does not intercept or otherwise interfere with user input, allowing the user to continue working with the computing device 100.

While displaying the avatar in the engaged state, execution of the method 600 proceeds in parallel to blocks 640 and 644. In block 640, the computing device 100 performs speech recognition on audio input received from the audio sensor 130 while the avatar is in the engaged state. In some embodiments, the computing device 100 may perform a more accurate or more computationally-intense speech recognition method while in the engaged state, because it is likely that the user is directly addressing the virtual personal assistant 208. For example, the computing device 100 may perform the speech recognition method of introducing distortion described above in connection with FIG. 4, or any other speech recognition technique.

In block 642, the computing device 100 determines whether or not a command has been received that may be executed by the virtual personal assistant 208. The computing device 100 may apply the results of speech recognition determined in block 640 to a speech recognition grammar of the virtual personal assistant 208 to determine whether a valid command has been issued. If no command has been received, the method 600 loops back to block 640 to continue performing speech recognition. If a command has been received, the method 600 advances to block 652 as described below.

As described above, the method 600 executes block 644 in parallel with block 640. In block 644, the computing device 100 monitors the user engagement level while in the engaged state. As described above in connection with block 624, the computing device 100 determines the level of interest the user is exhibiting in the avatar, which may allow for more natural interactions. In some embodiments, in block 646, the computing device 100 may receive eye tracking data from the eye tracking sensor 132. As described above with respect to block 626, the computing device 100 may determine the engagement level based on whether or not the user's eyes are focused on the avatar. In some embodiments, in block 648 the computing device 100 may receive audio input from the audio sensor 130. As described above in connection with block 628, the computing device 100 may analyze the audio input to determine whether the user is addressing the virtual personal assistant 208. In some embodiments, the computing device 100 may use speech recognition results from block 640 to determine whether the user is addressing the virtual personal assistant 208.

In block 650, the computing device 100 determines whether the user is engaged with the avatar. As described above in connection with block 630, the computing device 100 may compare the user engagement level determined in block 644 with a threshold engagement level. If the user is engaged with the avatar, the method 600 loops back to block 644 to continue monitoring the user engagement level. To summarize that interaction, if the user remains actively engaged with the avatar, for example, by engaging in eye contact with the avatar, the avatar also remains in the engaged state. That interaction may simulate a natural interaction as when holding a conversation. If in block 650 the computing device 100 determines that the user is not engaged, the method 600 loops back to block 602 of FIG. 6A to render the avatar in the disengaged state. To summarize that interaction, if after some time of engagement the user is no longer engaged, for example by turning back to other work, then the avatar also leaves, or begins to leave, the engaged state. That interaction may simulate a natural interaction as when a person completes a conversation.

When the method 600 advances from block 642 to block 652 or loops back from block 650 to block 602, the computing device 100 encounters a task synchronization boundary, illustrated in FIG. 6B by a thick line. The task synchronization boundary ensures that only one task of method 600 remains active in the computing device 100. For example, when advancing from block 642 to block 652 based on a received speech command, the computing device 100 may terminate the task executing block 644, causing the computing device 100 to stop monitoring the user engagement level. Similarly, when looping back from block 650 to block 602, the computing device 100 may terminate the task executing block 640, causing the computing device 100 to stop performing speech recognition. Further, although illustrated as being performed in parallel, in other embodiments the tasks of performing speech recognition and monitoring the user engagement level may be performed sequentially or in an interleaved manner.

In block 652, the computing device 100 displays the avatar in a working state. The working state indicates to the user that the virtual personal assistant 208 is currently executing a task. In some embodiments, the working state includes a representation of the task being performed, for example, an application icon or a representation of the avatar performing a task. In some embodiments, the avatar displayed in the working state may be similar or identical to the avatar displayed in the disengaged state; that is, the avatar displayed in the working state may be unobtrusive and may not interfere with the user performing other work on the computing device 100. In some embodiments, in block 654 the computing device 100 may increase the transparency of the avatar on the display 128. In some embodiments, in block 656, the computing device 100 may adjust the size and/or position of the avatar. For example, the computing device 100 may decrease the size of the avatar or move the avatar way from a currently active application on the display 128.

In block 658, while the avatar is displayed in the working state the computing device 100 executes the command received from the user. The command may be executed by the virtual personal assistant 208 or by various other applications of the computing device 100 controlled by the virtual personal assistant 208. Further, in some embodiments, while the avatar is displayed in the working state, the computing device 100 may monitor for activation of the assistant by the user, similar to as described above in connection with FIG. 408. Monitoring for activation may allow the user to interrupt the currently executing command or initiate a new command.

After completion of the command, in block 660 the computing device 100 determines whether to notify the user of completion. For example, if execution of the command produced displayable results or error messages, the computing device 100 may determine to notify the user. If the computing device 100 determines to notify the user, the method 600 loops back to block 616 of FIG. 6A to display the avatar in the ready state. To summarize that interaction, the avatar works on a task unobtrusively in the background for some time and then notifies the user of completion in a natural manner. The user may then interact with the avatar as described above to receive the notification. If in block 660 the computing device 100 determines not to notify the user, the method 600 loops back to block 602 of FIG. 6A to display the avatar in the disengaged state and await further activation. To summarize that interaction, the avatar works on a task unobtrusively in the background for some time and then returns to the disengaged state, indicating to the user in a natural manner that the virtual personal assistant 208 is free for further interactions.

In the preceding illustrative embodiment, the user engagement has been described as a binary value—either engaged or not engaged. However, in other embodiments, the user engagement level may be measured on a continuum. In those embodiments, the avatar may be displayed with properties that reflect the value of the user engagement level. For example, the transparency of the avatar may be smoothly adjusted over a range of values to indicate the user engagement level. Similarly, the size or position of the avatar may also be smoothly adjusted over a range of values to indicate the user engagement level.

EXAMPLES

Illustrative examples of the devices, systems, and methods disclosed herein are provided below. An embodiment of the devices, systems, and methods may include any one or more, and any combination of, the examples described below.

Example 1 includes a computing device for speech recognition, the computing device comprising an audio sensor; an audio input module to capture audio input using the audio sensor; and distort the audio input to produce a plurality of distorted audio variations; and a speech recognition module to perform speech recognition on the audio input and each of the distorted audio variations to produce a plurality of speech recognition results; and select a result from the speech recognition results based on contextual information.

Example 2 includes the subject matter of Example 1, and wherein to distort the audio input comprises to remove an internal segment of the audio input.

Example 3 includes the subject matter of any of Examples 1 and 2, and wherein the internal segment of the audio input comprises a segment having an amplitude with a predefined relationship to an amplitude threshold.

Example 4 includes the subject matter of any of Examples 1-3, and wherein to distort the audio input comprises to expand a length of a segment of the audio input having an amplitude with a predefined relationship to an amplitude threshold.

Example 5 includes the subject matter of any of Examples 1-4, wherein the segment having an amplitude with the predefined relationship to the amplitude threshold comprises a segment having an amplitude below the amplitude threshold.

Example 6 includes the subject matter of any of Examples 1-5, and wherein to distort the audio input comprises to insert a pause at a phonetic split point of the audio input identified by performing speech recognition on the audio input.

Example 7 includes the subject matter of any of Examples 1-6, and wherein to distort the audio input comprises at least one of to: (i) speed up the audio input, (ii) slow down the audio input, (iii) adjust a pitch of the audio input, or (iv) introduce noise to the audio input.

Example 8 includes the subject matter of any of Examples 1-7, and wherein the plurality of speech recognition results comprises at least one hundred speech recognition results.

Example 9 includes the subject matter of any of Examples 1-8, and further comprising one or more applications having a speech recognition grammar; wherein the speech recognition module is further to determine semantically relevant results of the speech recognition results based on the speech recognition grammar of the one or more applications; and wherein to select the result from the speech recognition results comprises to select a result from the semantically relevant results.

Example 10 includes the subject matter of any of Examples 1-9, and wherein the one or more applications comprise a virtual personal assistant.

Example 11 includes a computing device for speech recognition, the computing device comprising: an audio sensor; an audio input module to: capture audio input using the audio sensor; and distort the audio input to produce a plurality of distorted audio variations; and a speech analysis module to: transmit the audio input and the distorted audio variations from the computing device to a speech recognition module; receive a plurality of speech recognition results from the speech recognition module based on the audio input and the distorted audio variations; and select a result from the speech recognition results based on contextual information.

Example 12 includes the subject matter of Example 11, and wherein the speech recognition module is located on a server remote from the computing device.

Example 13 includes the subject matter of any of Examples 11 and 12, and wherein to distort the audio input comprises to remove an internal segment of the audio input.

Example 14 includes the subject matter of any of Examples 11-13, and wherein the internal segment of the audio input comprises a segment having an amplitude with a predefined relationship to an amplitude threshold.

Example 15 includes the subject matter of any of Examples 11-14, and wherein to distort the audio input comprises to expand a length of a segment of the audio input having an amplitude with a predefined relationship to an amplitude threshold.

Example 16 includes the subject matter of any of Examples 11-15, and wherein the segment having an amplitude with the predefined relationship to the amplitude threshold comprises a segment having an amplitude below the amplitude threshold.

Example 17 includes the subject matter of any of Examples 11-16, and wherein to distort the audio input comprises to insert a pause at a phonetic split point of the audio input identified by performing speech recognition on the audio input.

Example 18 includes the subject matter of any of Examples 11-17, and wherein to distort the audio input comprises at least one of to: (i) speed up the audio input, (ii) slow down the audio input, (iii) adjust a pitch of the audio input, or (iv) introduce noise to the audio input.

Example 19 includes the subject matter of any of Examples 11-18, and wherein the plurality of speech recognition results comprises at least one hundred speech recognition results.

Example 20 includes a speech recognition server for speech recognition, the speech recognition server comprising: a distortion module to: receive audio input captured by a computing device; and distort the audio input to produce a plurality of distorted audio variations; and a speech recognition module to: perform speech recognition on the audio input and each of the distorted audio variations to produce a plurality of speech recognition results; and transmit the plurality of speech recognition results to the computing device.

Example 21 includes the subject matter of Example 20, and wherein to distort the audio input comprises to remove an internal segment of the audio input.

Example 22 includes the subject matter of any of Examples 20 and 21, and wherein the internal segment of the audio input comprises a segment having an amplitude with a predefined relationship to an amplitude threshold.

Example 23 includes the subject matter of any of Examples 20-22, and wherein to distort the audio input comprises to expand a length of a segment of the audio input having an amplitude with a predefined relationship to an amplitude threshold.

Example 24 includes the subject matter of any of Examples 20-23, and wherein the segment having the amplitude with the predefined relationship to the amplitude threshold comprises a segment having an amplitude below the amplitude threshold.

Example 25 includes the subject matter of any of Examples 20-24, and wherein to distort the audio input comprises to insert a pause at a phonetic split point of the audio input identified by performing speech recognition on the audio input.

Example 26 includes the subject matter of any of Examples 20-25, and wherein to distort the audio input comprises one of to: (i) speed up the audio input, (ii) slow down the audio input, (iii) adjust a pitch of the audio input, or (iv) introduce noise to the audio input.

Example 27 includes the subject matter of any of Examples 20-26, and wherein the plurality of speech recognition results comprises at least one hundred speech recognition results.

Example 28 includes a computing device comprising: a display; a virtual personal assistant to display an avatar of the virtual personal assistant on the display in a disengaged state, a ready state, and an engaged state; and an engagement module to: determine whether a user of the computing device has requested activation of the virtual personal assistant while the avatar is displayed in the disengaged state; and determine an engagement level of the user while the avatar is displayed in the ready state; wherein the virtual personal assistant is to: display the avatar in the ready state in response to a determination that the user has requested activation of the virtual personal assistant; display the avatar in the engaged state in response to a determination that the user has an engagement level greater than a threshold level; and display the avatar in the disengaged state in response to a determination that the user has an engagement level less than the threshold level.

Example 29 includes the subject matter of Example 28, and wherein the engagement module is further to monitor the engagement level of the user while the avatar is displayed in the engaged state.

Example 30 includes the subject matter of any of Examples 28-29, and further comprising an eye tracking sensor, wherein to determine whether the user has requested activation of the virtual personal assistant comprises to: receive eye tracking data from the eye tracking sensor; and determine whether the user has focused on the avatar based on the eye tracking data.

Example 31 includes the subject matter of any of Examples 28-30, and further comprising an audio sensor, wherein to determine whether the user has requested activation of the virtual personal assistant comprises to: receive audio input from the audio sensor; and detect a code word uttered by the user based on the audio input.

Example 32 includes the subject matter of any of Examples 28-31, and further comprising an eye tracking sensor, wherein to determine the engagement level of the user comprises to: receive eye tracking data from the eye tracking sensor; determine, based on the eye tracking data, whether the user has visually focused on the avatar for a period of time greater than a threshold time; determine that the user has an engagement level greater than the threshold level in response to a determination that the user has visually focused on the avatar for a period of time greater than the threshold time; and determine that the user has an engagement level less than the threshold level in response to a determination that the user has not visually focused on the avatar for a period of time greater than the threshold time.

Example 33 includes the subject matter of any of Examples 28-32, and wherein to determine whether the user has visually focused on the avatar for a period of time greater than the threshold time comprises to ignore glances away from the avatar for a second period of time less than a second threshold time.

Example 34 includes the subject matter of any of Examples 28-33, and further comprising an audio sensor, wherein to determine the engagement level of the user comprises to receive audio input from the audio sensor.

Example 35 includes the subject matter of any of Examples 28-34, and wherein: to display the avatar in the ready state comprises to display an anthropomorphic representation of eye contact of the avatar with the user; and to display the avatar in the engaged state comprises to display an anthropomorphic representation of eye contact of the avatar with the user.

Example 36 includes the subject matter of any of Examples 28-35, and further comprising an eye tracking sensor, wherein to display the anthropomorphic representation of eye contact comprises to: receive at least one of eye tracking data or head position data from the eye tracking sensor; and display an anthropomorphic representation of eyes of the avatar following the user.

Example 37 includes the subject matter of any of Examples 28-36, and wherein: to display the avatar of the virtual personal assistant in the disengaged state comprises to display the avatar as semitransparent, to allow a user interface element of the computing device to shine through the avatar; to display the avatar in the ready state comprises to decrease a transparency of the avatar; and to display the avatar in the engaged state comprises one of to: decrease the transparency of the avatar or eliminate the transparency of the avatar.

Example 38 includes the subject matter of any of Examples 28-37, and wherein: to display the avatar of the virtual personal assistant in the disengaged state comprises to display the avatar at a position on the display away from an active application of the computing device; to display the avatar in the ready state comprises to move the avatar on the display to a position closer to an active application of the computing device; and to display the avatar in the engaged state comprises to move the avatar on the display to a position over an active application of the computing device without preventing input from the user to the active application.

Example 39 includes the subject matter of any of Examples 28-38, and further comprising an eye tracking sensor, wherein: to display the avatar in the ready state comprises to move the avatar on the display to a position closer to a position where the user is focused, based on eye tracking data received from the eye tracking sensor; and to display the avatar in the engaged state comprises to move the avatar on the display to a position closer to a position where the user is focused, based on eye tracking data received from the eye tracking sensor.

Example 40 includes the subject matter of any of Examples 28-39, and wherein: to display the avatar of the virtual personal assistant in the disengaged state comprises to display the avatar as invisible; and to display the avatar in the ready state comprises to display the avatar as visible.

Example 41 includes the subject matter of any of Examples 28-40, and wherein the virtual personal assistant is further to: perform speech recognition while the avatar is in the engaged state; determine whether the user has issued a command based on the speech recognition; and display the avatar in a working state in response to a determination that the user has issued the command.

Example 42 includes the subject matter of any of Examples 28-41, and wherein to display the avatar in the working state comprises at least one of to: (i) increase a transparency of the avatar or (ii) move the avatar on the display to a position away from an active application of the computing device.

Example 43 includes a method for speech recognition on a computing device, the method comprising: capturing audio input using an audio sensor of the computing device; distorting the audio input to produce a plurality of distorted audio variations; performing speech recognition on the audio input and each of the distorted audio variations to produce a plurality of speech recognition results; and selecting a result from the speech recognition results based on contextual information.

Example 44 includes the subject matter of Example 43, and wherein distorting the audio input comprises removing an internal segment of the audio input.

Example 45 includes the subject matter of any of Examples 43 and 44, and wherein removing the internal segment of the audio input comprises removing a segment of the audio input having an amplitude with a predefined relationship to an amplitude threshold.

Example 46 includes the subject matter of any of Examples 43-45, and wherein removing the internal segment comprises removing the segment having an amplitude below the amplitude threshold.

Example 47 includes the subject matter of any of Examples 43-46, and wherein distorting the audio input comprises expanding a length of a segment of the audio input having an amplitude with a predefined relationship to an amplitude threshold.

Example 48 includes the subject matter of any of Examples 43-47, and wherein expanding the length of the segment comprises expanding a length of the segment having amplitude below the amplitude threshold.

Example 49 includes the subject matter of any of Examples 43-48, and wherein distorting the audio input comprises inserting a pause at a phonetic split point of the audio input identified by performing speech recognition on the audio input.

Example 50 includes the subject matter of any of Examples 43-49, and wherein distorting the audio input comprises performing at least one of: (i) speeding up the audio input, (ii) slowing down the audio input, (iii) adjusting a pitch of the audio input, or (iv) introducing noise to the audio input.

Example 51 includes the subject matter of any of Examples 43-50, and wherein performing speech recognition on the audio input and the distorted audio variations to produce the plurality of speech recognition results comprises performing speech recognition on the audio input and the distorted audio variations to produce at least one hundred speech recognition results.

Example 52 includes the subject matter of any of Examples 43-51, and further comprising determining semantically relevant results of the speech recognition results based on a speech recognition grammar of one or more applications of the computing device; wherein selecting the result from the speech recognition results comprises selecting a result from the semantically relevant results.

Example 53 includes the subject matter of any of Examples 43-52, and wherein determining the semantically relevant results based on the speech recognition grammar of the one or more applications comprises determining the semantically relevant results based on a speech recognition grammar of a virtual personal assistant of the computing device.

Example 54 includes a method for speech recognition on a computing device, the method comprising: capturing audio input using an audio sensor of the computing device; distorting, on the computing device, the audio input to produce a plurality of distorted audio variations; transmitting the audio input and the distorted audio variations from the computing device to a speech recognition module; receiving a plurality of speech recognition results from the speech recognition module based on the audio input and the distorted audio variations; and selecting, on the computing device, a result from the speech recognition results based on contextual information.

Example 55 includes the subject matter of Example 54, and wherein: transmitting the audio input and the distorted audio variations to the speech recognition module comprises transmitting the audio input and the distorted audio variations to a speech recognition module located on a server remote from the computing device; and receiving the plurality of speech recognition results from the speech recognition module comprises receiving the plurality of speech recognition results from the speech recognition module located on the server.

Example 56 includes the subject matter of any of Examples 54 and 55, and wherein distorting the audio input comprises removing an internal segment of the audio input.

Example 57 includes the subject matter of any of Examples 54-56, and wherein removing the internal segment of the audio input comprises removing a segment of the audio input having an amplitude with a predefined relationship to an amplitude threshold.

Example 58 includes the subject matter of any of Examples 54-57, and wherein removing the internal segment comprises removing the segment having an amplitude below the amplitude threshold.

Example 59 includes the subject matter of any of Examples 54-58, and wherein distorting the audio input comprises expanding a length of a segment of the audio input having an amplitude with a predefined relationship to an amplitude threshold.

Example 60 includes the subject matter of any of Examples 54-59, and wherein expanding the length of the segment comprises expanding a length of the segment having amplitude below the amplitude threshold.

Example 61 includes the subject matter of any of Examples 54-60, and wherein distorting the audio input comprises inserting a pause at a phonetic split point of the audio input identified by performing speech recognition on the audio input.

Example 62 includes the subject matter of any of Examples 54-61, and wherein distorting the audio input comprises performing at least one of: (i) speeding up the audio input, (ii) slowing down the audio input, (iii) adjusting a pitch of the audio input, or (iv) introducing noise to the audio input.

Example 63 includes the subject matter of any of Examples 54-62, and wherein performing speech recognition on the audio input and the distorted audio variations to produce the plurality of speech recognition results comprises performing speech recognition on the audio input and the distorted audio variations to produce at least one hundred speech recognition results.

Example 64 includes a method for speech recognition on a speech recognition server, the method comprising: receiving, on the speech recognition server, audio input captured by a computing device; distorting, on the speech recognition server, the audio input to produce a plurality of distorted audio variations; performing, on the speech recognition server, speech recognition on the audio input and each of the distorted audio variations to produce a plurality of speech recognition results; and transmitting the plurality of speech recognition results to the computing device.

Example 65 includes the subject matter of Example 64, and wherein distorting the audio input comprises removing an internal segment of the audio input.

Example 66 includes the subject matter of any of Examples 64 and 65, and wherein removing the internal segment of the audio input comprises removing a segment of the audio input having an amplitude with a predefined relationship to an amplitude threshold.

Example 67 includes the subject matter of any of Examples 64-66, and wherein removing the internal segment comprises removing the segment having an amplitude below the amplitude threshold.

Example 68 includes the subject matter of any of Examples 64-67, and wherein distorting the audio input comprises expanding a length of a segment of the audio input having an amplitude with a predefined relationship to an amplitude threshold.

Example 69 includes the subject matter of any of Examples 64-68, and wherein expanding the length of the segment comprises expanding a length of the segment having amplitude below the amplitude threshold.

Example 70 includes the subject matter of any of Examples 64-69, and wherein distorting the audio input comprises inserting a pause at a phonetic split point of the audio input identified by performing speech recognition on the audio input.

Example 71 includes the subject matter of any of Examples 64-70, and wherein distorting the audio input comprises performing at least one of: (i) speeding up the audio input, (ii) slowing down the audio input, (iii) adjusting a pitch of the audio input, or (iv) introducing noise to the audio input.

Example 72 includes the subject matter of any of Examples 64-71, and wherein performing speech recognition on the audio input and the distorted audio variations to produce the plurality of speech recognition results comprises performing speech recognition on the audio input and the distorted audio variations to produce at least one hundred speech recognition results.

Example 73 includes a method for interaction with a virtual personal assistant on a computing device, the method comprising: displaying an avatar of the virtual personal assistant in a disengaged state on a display of the computing device; determining, on the computing device, whether a user of the computing device has requested activation of the virtual personal assistant; displaying, on the computing device, the avatar in a ready state in response to determining that the user has requested activation of the virtual personal assistant; determining, on the computing device, an engagement level of the user while the avatar is in the ready state; displaying, on the computing device, the avatar in an engaged state in response to the user having an engagement level greater than a threshold level; and displaying, on the computing device, the avatar in the disengaged state in response to the user having an engagement level less than the threshold level.

Example 74 includes the subject matter of Example 73, and further comprising monitoring the engagement level of the user while the avatar is in the engaged state.

Example 75 includes the subject matter of any of Examples 73 and 74, and wherein determining whether the user has requested activation of the virtual personal assistant comprises: receiving eye tracking data from an eye tracking sensor of the computing device; and determining whether the user has focused on the avatar based on the eye tracking data.

Example 76 includes the subject matter of any of Examples 73-75, and wherein determining whether the user has requested activation of the virtual personal assistant comprises: receiving audio input from an audio sensor of the computing device; and detecting a code word uttered by the user based on the audio input.

Example 77 includes the subject matter of any of Examples 73-76, and wherein determining the engagement level of the user comprises: receiving eye tracking data from an eye tracking sensor of the computing device; determining, based on the eye tracking data, whether the user has visually focused on the avatar for a period of time greater than a threshold time; determining that the user has an engagement level greater than the threshold level in response to determining that the user has visually focused on the avatar for a period of time greater than the threshold time; and determining that the user has an engagement level less than the threshold level in response to determining that the user has not visually focused on the avatar for a period of time greater than the threshold time.

Example 78 includes the subject matter of any of Examples 73-77, and wherein determining whether the user has visually focused on the avatar for a period of time greater than the threshold time comprises ignoring glances away from the avatar for a second period of time less than a second threshold time.

Example 79 includes the subject matter of any of Examples 73-78, and wherein determining the engagement level of the user comprises receiving audio input from an audio sensor of the computing device.

Example 80 includes the subject matter of any of Examples 73-79, and wherein: displaying the avatar in the ready state comprises displaying an anthropomorphic representation of eye contact of the avatar with the user; and displaying the avatar in the engaged state comprises displaying an anthropomorphic representation of eye contact with the user.

Example 81 includes the subject matter of any of Examples 73-80, and wherein displaying the anthropomorphic representation of eye contact comprises: receiving at least one of eye tracking data or head position data from an eye tracking sensor of the computing device; and displaying an anthropomorphic representation of eyes of the avatar following the user.

Example 82 includes the subject matter of any of Examples 73-81, and wherein displaying the avatar of the virtual personal assistant in the disengaged state comprises: displaying the avatar as semitransparent, allowing a user interface element of the computing device to shine through the avatar; displaying the avatar in the ready state comprises decreasing a transparency of the avatar; and displaying the avatar in the engaged state comprises one of: decreasing the transparency of the avatar or eliminating the transparency of the avatar.

Example 83 includes the subject matter of any of Examples 73-82, and wherein: displaying the avatar of the virtual personal assistant in the disengaged state comprises displaying the avatar at a position on the display away from an active application of the computing device; displaying the avatar in the ready state comprises moving the avatar on the display to a position closer to an active application of the computing device; and displaying the avatar in the engaged state comprises moving the avatar on the display to a position over an active application of the computing device without preventing input from the user to the active application.

Example 84 includes the subject matter of any of Examples 73-83, and wherein: displaying the avatar in the ready state comprises moving the avatar on the display to a position closer to a position where the user is focused, based on eye tracking data received from an eye tracking sensor of the computing device; and displaying the avatar in the engaged state comprises moving the avatar on the display to a position closer to a position where the user is focused, based on eye tracking data received from an eye tracking sensor of the computing device.

Example 85 includes the subject matter of any of Examples 73-84, and wherein: displaying the avatar of the virtual personal assistant in the disengaged state comprises displaying the avatar as invisible; and displaying the avatar in the ready state comprises displaying the avatar as visible.

Example 86 includes the subject matter of any of Examples 73-85, and further comprising: performing speech recognition while the avatar is in the engaged state; determining whether the user has issued a command based on the speech recognition; and displaying the avatar in a working state in response to determining the user has issued the command.

Example 87 includes the subject matter of any of Examples 73-86, and wherein displaying the avatar in the working state comprises at least one of: (i) increasing a transparency of the avatar or (ii) moving the avatar on the display to a position away from an active application of the computing device.

Example 88 includes a computing device comprising: a processor; and a memory having stored therein a plurality of instructions that when executed by the processor cause the computing device to perform the method of any of Examples 43-87.

Example 89 includes one or more machine readable storage media comprising a plurality of instructions stored thereon that in response to being executed result in a computing device performing the method of any of Examples 43-87.

Example 90 includes a computing device comprising means for performing the method of any of Examples 43-87.

The invention claimed is:

1. A system comprising:
   a display screen;
   an audio transducer;
   at least one sensor;
   at least one memory;
   instructions in the system; and
   processor circuitry to execute the instructions to:
   cause the display screen to display a virtual personal assistant avatar in a first state, the virtual personal assistant avatar to exhibit a face, the face including human facial features;
   detect a presence of a user based on one or more signals from the at least one sensor;
   cause the display screen to display the virtual personal assistant avatar in a second state in response to the detection of the presence of the user, the second state different than the first state, the second state corresponding to a ready state;
   cause the display screen to display the virtual personal assistant avatar in a third state, the third state different than the first state and the second state;
   cause at least one of the display screen or the audio transducer to output a response to a speech input;

cause the display screen to display the virtual personal assistant avatar with an eye gaze directed away from the user in the first state; and cause the display screen to display the virtual personal assistant avatar with the eye gaze directed toward the user in at least one of the second state or the third state.

2. The system as defined in claim 1, wherein the processor circuitry is to detect the presence of the user based on image data from the one or more signals.

3. The system as defined in claim 1, wherein the processor circuitry is to detect the presence of the user based on an audio signal from the at least one sensor.

4. The system as defined in claim 1, wherein the processor circuitry is to cause the display screen to present the virtual personal assistant avatar to face out from the display screen.

5. The system as defined in claim 1, wherein the first state corresponds to an idle state.

6. The system as defined in claim 1, wherein the processor circuitry is to cause the display screen to display the virtual personal assistant avatar to make eye contact with the user in one or more of the second state or the third state.

7. The system as defined in claim 1, wherein the processor circuitry is to cause the display screen to display content other than the virtual personal assistant avatar simultaneously with the virtual personal assistant avatar.

8. The system as defined in claim 1, wherein the processor circuitry is to cause the display screen to display the human facial features of the virtual personal assistant avatar as opaque.

9. A system comprising:
a display screen;
means for tracking a presence of a user; and
means for capturing audio;
processing means for:
causing the display screen to display a virtual personal assistant avatar in a first state, the virtual personal assistant avatar having a face including human facial features;
detecting the presence of the user based on one or more signals from the tracking means;
causing the display screen to display the virtual personal assistant avatar in a second state, the second state different than the first state, the second state corresponding to a ready state of the virtual personal assistant avatar to provide interactions with the user;
detecting a speech input from the user based on one or more signals from the audio capturing means;
causing the display screen to display the virtual personal assistant avatar in a third state, the third state different than the first state and the second state;
causing the display screen to present a response to the speech input;
causing the display screen to display the virtual personal assistant avatar with an eye gaze directed away from the user at a first time; and
causing the display screen to display the virtual personal assistant avatar with the eye gaze directed toward the user at a second time.

10. The system as defined in claim 9, wherein the means for tracking is a camera.

11. The system as defined in claim 9, wherein the processing means is to cause the display screen to display the virtual personal assistant avatar to face out of the display screen.

12. The system as defined in claim 9, wherein the first state corresponds to an idle state.

13. The system as defined in claim 9, wherein the processing means is to cause the display screen to display the virtual personal assistant avatar in the second state from the first state in response to the detection of the presence of the user.

14. The system as defined in claim 13, wherein the processing means is to detect the presence of the user based on image data from the one or more signals from the tracking means.

15. The system as defined in claim 9, wherein the speech input is a first speech input and the processing means is to cause the display screen to display the virtual personal assistant avatar in the second state in response to a second speech input.

16. The system as defined in claim 15, wherein the second speech input includes a trigger word for the virtual personal assistant avatar.

17. The system as defined in claim 9, wherein the processing means is to cause the display screen to display the virtual personal assistant avatar to make eye contact with the user in one or more of the second state or the third state.

18. The system as defined in claim 9, wherein the processing means is to cause the display screen to display content other than the virtual personal assistant avatar simultaneously with the virtual personal assistant avatar.

19. The system as defined in claim 9, wherein the processing means is to cause the human facial features of the virtual personal assistant avatar to be displayed as opaque.

20. At least one tangible machine readable storage device comprising instructions that, when executed, cause at least one processor to at least:
cause a display screen to display a virtual personal assistant avatar in a first state, the virtual personal assistant avatar having a face including human facial features;
cause the display screen to display the virtual personal assistant avatar in a second state, the second state different than the first state, the second state corresponding to a ready state of the virtual personal assistant avatar to provide interactions with a user;
detect a speech input from the user;
cause the display screen to display the virtual personal assistant avatar in a third state, the third state different than the first state and the second state;
cause the display screen to present a response to the speech input;
cause the display screen to display the virtual personal assistant avatar with an eye gaze directed away from the user at a first time; and
cause the display screen to display the virtual personal assistant avatar with the eye gaze directed toward the user at a second time.

21. The at least one tangible machine readable storage device as defined in claim 20, wherein the instructions, when executed, cause the at least one processor to cause the display screen to display the virtual personal assistant avatar to face out of the display screen.

22. The at least one tangible machine readable storage device as defined in claim 20, wherein the first state corresponds to an idle state.

23. The at least one tangible machine readable storage device as defined in claim 20, wherein the instructions, when executed, cause the at least one processor to:
detect a presence of the user based on one or more signals from at least one sensor; and cause the display screen to display the virtual personal assistant avatar in the second state from the first state in response to the detection of the presence of the user.

24. The at least one tangible machine readable storage device as defined in claim 23, wherein the at least one processor is to detect the presence of the user based on image data from the one or more signals.

25. The at least one tangible machine readable storage device as defined in claim 20, wherein the speech input is a first speech input and the instructions, when executed, cause the at least one processor to cause the display screen to display the virtual personal assistant avatar in the second state in response to a second speech input.

26. The at least one tangible machine readable storage device as defined in claim 25, wherein the second speech input includes a trigger word for the virtual personal assistant avatar.

27. The at least one tangible machine readable storage device as defined in claim 20, wherein the instructions, when executed, cause the at least one processor to cause the display screen to display the virtual personal assistant avatar to make eye contact with the user in one or more of the second state or the third state.

28. The at least one tangible machine readable storage device as defined in claim 20, wherein the instructions, when executed, cause the at least one processor to cause the display screen to display content other than the virtual personal assistant avatar simultaneously with the virtual personal assistant avatar.

29. The at least one tangible machine readable storage device as defined in claim 20, wherein the instructions, when executed, cause the at least one processor to cause the display screen to display the human facial features of the virtual personal assistant avatar as opaque.

* * * * *